United States Patent
Kuhne et al.

(10) Patent No.: US 10,227,928 B2
(45) Date of Patent: Mar. 12, 2019

(54) ENGINE ARCHITECTURE WITH REVERSE ROTATION INTEGRAL DRIVE AND VANELESS TURBINE

(71) Applicant: General Electric Company, Schenectady, NY (US)

(72) Inventors: Craig Miller Kuhne, Cincinnati, OH (US); Christopher Charles Glynn, Lawrenceburg, IN (US); Randy M. Vondrell, Sharonville, OH (US); Andrew Breeze-Stringfellow, Montgomery, OH (US); Kurt David Murrow, Liberty Township, OH (US); Darek T. Zatorski, Ft. Wright, KY (US); Donald Scott Yeager, Loveland, OH (US); Nicholas Rowe Dinsmore, Cincinnati, OH (US); Samuel Jacob Martin, Independence, KY (US); Donald Albert Bradley, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 363 days.

(21) Appl. No.: 14/761,698

(22) PCT Filed: Jan. 14, 2014

(86) PCT No.: PCT/US2014/011434
§ 371 (c)(1),
(2) Date: Jul. 17, 2015

(87) PCT Pub. No.: WO2014/113372
PCT Pub. Date: Jul. 24, 2014

(65) Prior Publication Data
US 2015/0354502 A1    Dec. 10, 2015

Related U.S. Application Data

(60) Provisional application No. 61/754,086, filed on Jan. 18, 2013.

(51) Int. Cl.
*F02C 7/36* (2006.01)
*F02C 3/073* (2006.01)
(Continued)

(52) U.S. Cl.
CPC ............... *F02C 7/36* (2013.01); *F02C 3/073* (2013.01); *F02C 3/107* (2013.01); *F02K 3/06* (2013.01);
(Continued)

(58) Field of Classification Search
CPC .. F02K 3/072; F02C 3/107; F02C 7/36; F02C 3/067; F05D 2260/40311
See application file for complete search history.

(56) References Cited

U.S. PATENT DOCUMENTS 3,673,802 A    7/1972 Krebs et al.
3,729,957 A    5/1973 Petrie et al.
(Continued)

FOREIGN PATENT DOCUMENTS

CN    1877100 A    12/2006
CN    101240719 A    8/2008
(Continued)

OTHER PUBLICATIONS

Unofficial English Translation of Japanese Office Action issued in connection with corresponding JP Application No. 2015-553777 dated Jun. 21, 2016.
(Continued)

*Primary Examiner* — Craig Kim
(74) *Attorney, Agent, or Firm* — General Electric Company; Pamela Kachur (57) ABSTRACT

A gas turbine engine comprises a fan, a compressor, a turbine having first stage blades and second stage blades, the first stage blades rotates in a first direction and the second stage blades rotates in a second direction opposite the first direction. The first stage blades are directly adjacent to one another, a drive in operable input connection with the fan and in operable output connection with the first stage blades and the second stage blades, the first stage blades and the second stage blades driving the fan through the drive.

20 Claims, 6 Drawing Sheets

(51) Int. Cl.
    *F02K 3/06*     (2006.01)
    *F02K 3/072*     (2006.01)
    *F02C 3/107*     (2006.01)

(52) U.S. Cl.
    CPC ...... *F02K 3/072* (2013.01); *F05D 2260/4031* (2013.01); *Y02T 50/672* (2013.01)

(56) References Cited

U.S. PATENT DOCUMENTS

| | | | |
|---|---|---|---|
| 3,861,139 A | 1/1975 | Jones | |
| 4,220,057 A * | 9/1980 | Kronogard | F02C 7/36 60/792 |
| 4,817,382 A | 4/1989 | Rudolph et al. | |
| 4,916,894 A | 4/1990 | Adamson et al. | |
| 5,010,729 A * | 4/1991 | Adamson | F02C 3/067 416/129 |
| 5,274,999 A | 1/1994 | Rohra et al. | |
| 5,315,821 A | 5/1994 | Dunbar et al. | |
| 6,619,030 B1 * | 9/2003 | Seda | F01D 9/041 60/226.1 |
| 6,684,626 B1 | 2/2004 | Orlando et al. | |
| 6,732,502 B2 * | 5/2004 | Seda | F01D 5/03 60/226.1 |
| 7,107,756 B2 | 9/2006 | Rolt | |
| 7,246,482 B2 | 7/2007 | Mahoney et al. | |
| 7,363,757 B2 | 4/2008 | Loisy | |
| 7,451,592 B2 | 11/2008 | Taylor et al. | |
| 7,594,388 B2 | 9/2009 | Cherry et al. | |
| 7,752,836 B2 | 7/2010 | Orlando et al. | |
| 7,788,899 B2 | 9/2010 | Smith | |
| 7,950,220 B2 | 5/2011 | Merry et al. | |
| 8,015,798 B2 | 9/2011 | Norris et al. | |
| 8,104,261 B2 | 1/2012 | Marshall et al. | |
| 8,166,748 B2 | 5/2012 | Schilling | |
| 8,191,352 B2 | 6/2012 | Schilling | |
| 9,404,420 B2 * | 8/2016 | Gallet | F16H 57/0423 |
| 2005/0226720 A1 | 10/2005 | Harvey et al. | |
| 2006/0090448 A1 | 5/2006 | Henry | |
| 2006/0185346 A1 | 8/2006 | Rolt | |
| 2006/0236675 A1 | 10/2006 | Weiler | |
| 2007/0051091 A1 | 3/2007 | Rolt | |
| 2008/0098713 A1 | 5/2008 | Orlando et al. | |
| 2008/0098718 A1 | 5/2008 | Henry et al. | |
| 2008/0149445 A1 | 6/2008 | Kern et al. | |
| 2008/0184694 A1 | 8/2008 | Guimbard et al. | |
| 2009/0048062 A1 | 2/2009 | Seo et al. | |
| 2010/0089028 A1 | 4/2010 | Baltas | |
| 2010/0154384 A1 | 6/2010 | Schilling | |
| 2010/0192595 A1 | 8/2010 | Orlando et al. | |
| 2010/0205934 A1 | 8/2010 | Gallet | |
| 2012/0023898 A1 | 2/2012 | Mackie et al. | |
| 2012/0099988 A1 | 4/2012 | Charier et al. | |
| 2013/0004297 A1 * | 1/2013 | Sheridan | F02C 7/36 415/122.1 |
| 2016/0146112 A1 * | 5/2016 | Van Der Merwe | F16H 57/08 475/331 |
| 2018/0163850 A1 * | 6/2018 | Lao | F02C 7/36 |

FOREIGN PATENT DOCUMENTS

| | | |
|---|---|---|
| CN | 101368616 A | 2/2009 |
| CN | 101963073 A | 2/2011 |
| GB | 2226599 A | 7/1990 |
| JP | 02245454 A | 10/1990 |
| JP | 2005264940 A | 9/2005 |
| JP | 2008111437 A | 5/2008 |
| JP | 2012031861 A | 2/2012 |
| JP | 2012132469 A | 7/2012 |
| JP | 2012520410 A | 9/2012 |

OTHER PUBLICATIONS

Unofficial English Translation of Chinese Office Action issued in connection with corresponding CN Application No. 201480005273.3 dated Mar. 23, 2016.
Unofficial English Translation of Chinese Office Action issued in connection with Corresponding CN Application No. 201480005273.3 dated Oct. 26, 2016.
International Search Report and Written Opinion issued in connection with corresponding PCT Application No. PCT/US2014/011434 dated May 6, 2014.

* cited by examiner

ENGINE ARCHITECTURE WITH REVERSE ROTATION INTEGRAL DRIVE AND VANELESS TURBINE

CROSS-REFERENCE TO RELATED APPLICATIONS

This is a national stage application under 35 U.S.C. § 371(c) of prior-filed, co-pending, PCT application serial number PCT/US2014/011434, filed on Jan. 14, 2014, which claims the benefit of U.S. Provisional Patent Application 61/754,086, entitled Engine Architecture with Reverse Rotation Integral Drive and Vaneless Turbine and filed Jan. 18, 2013. These applications are incorporated herein in their entirety.

BACKGROUND

The disclosed embodiments generally pertain to a gas turbine engine. More particularly, but not by way of limitation, present embodiments relate to aircraft engine architecture having a reverse rotation integral drive and a vaneless turbine with counter-rotating blades.

A typical gas turbine engine generally possesses a forward end and an aft end with its several core or propulsion components positioned axially therebetween. An air inlet or intake is at a forward end of the engine. Moving toward the aft end, in order, the intake is followed by a compressor, a combustion chamber, a turbine, and a nozzle at the aft end of the engine. It will be readily apparent from those skilled in the art that additional components may also be included in the engine, such as, for example, low pressure and high pressure compressors, and high pressure and low pressure turbines. This, however, is not an exhaustive list. An engine also typically has an internal shaft axially disposed along a center longitudinal axis of the engine. The internal shaft is connected to both the turbine and the air compressor, such that the turbine provides a rotational input to the air compressor to drive the compressor blades.

In operation, air is pressurized in a compressor and mixed with fuel in a combustor for generating hot combustion gases which flow downstream through turbine stages. These turbine stages extract energy from the combustion gases. A high pressure turbine first receives the hot combustion gases from the combustor and includes a stator nozzle assembly directing the combustion gases downstream through a row of high pressure turbine rotor blades extending radially outwardly from a supporting rotor disk. In a two stage turbine, a second stage stator nozzle assembly is positioned downstream of the first stage blades followed in turn by a row of second stage rotor blades extending radially outwardly from a second supporting rotor disk. The turbine converts the combustion gas energy to mechanical energy.

Various components of the gas turbine engine operate at highest efficiencies at different speeds. Many present aircraft engines utilize systems which directly couple the turbine and compressor and fan on shafts so that while one of the core components may be operating at maximum efficiency, the other components coupled by the same shaft are not operating at best efficiency. It is highly desirable to operate the aircraft engines at an efficient high bypass ratio, low fan pressure ratio with optimal design speeds for the fan, compressor or booster and the low pressure turbine.

It would also be desirable to reduce or minimize the number of stages required, by the low pressure compressor or booster, in the low pressure turbine.

As may be seen by the foregoing, it would be desirable to overcome these and other deficiencies with gas turbine engines components.

SUMMARY OF THE INVENTION

According to present aspects, an aircraft engine architecture that couples first and second stage blades of a turbine of at least a first speed and a second speed, a booster at the first speed and a fan at a third speed.

According to another aspect, a drive is provided wherein a turbine utilizes counter-rotating stage blades. The turbine is vaneless between the counter-rotating stages so that counter-rotating stages are directly adjacent one another.

According to some aspects, a gas turbine engine comprises a fan, a compressor, a turbine having first stage blades and second stage blades, the first stage blades rotating in a first direction and the second stage blades rotating in a second direction opposite the first direction, the first stage blades and the second stage blades being directly adjacent to one another, a drive in operable input connection with the fan and in operable output connection with the first stage blades and the second stage blades, the first stage blades and the second stage blades driving the fan through the drive.

According to still other aspects, a gas turbine engine comprises a fan, a compressor in fluid communication with a combustor, a turbine in fluid communication with combustion gas from the combustor; the turbine having at least two counter-rotating stage blades, the two counter-rotating stage blades being free of intermediate vanes, a drive operably connected intermediate to the turbine and the fan, the drive having a split power path receiving power input from at least two sources, a fan shaft and shafts of the two counter-rotating stage blades being independent of one another, one of the two counter-rotating stage blades powers the compressors and fan, and the other of two counter-rotating stage blades powers said fan.

All of the above outlined features are to be understood as exemplary only and many more features and objectives of the invention may be gleaned from the disclosure herein. Therefore, no limiting interpretation of this summary is to be understood without further reading of the entire specification, claims, and drawings included herewith.

BRIEF DESCRIPTION OF THE DRAWINGS

Embodiments of the invention are illustrated in the following illustrations.

DETAILED DESCRIPTION OF THE INVENTION

Reference now will be made in detail to embodiments provided, one or more examples of which are illustrated in the drawings. Each example is provided by way of explanation, not limitation of the disclosed embodiments. In fact, it will be apparent to those skilled in the art that various modifications and variations can be made in the present embodiments without departing from the scope or spirit of the disclosure. For instance, features illustrated or described as part of one embodiment can be used with another embodiment to still yield further embodiments. Thus it is intended that the present invention covers such modifications and variations as come within the scope of the appended claims and their equivalents.

Referring to FIGS. 1-7 various embodiments of a gas turbine engine are taught wherein the turbine has counter-rotating stages which are vaneless downstream of the first stage. Additionally, the engine provides an integral drive which allows split input of power from the two turbine stages wherein a portion of one stage powers a booster or low pressure compressor and a portion powers the engine fan. The second stage powers the fan allows the component speeds to be optimized for best efficiency and best operating speeds, independent of other components which are normally coupled together by shaft.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to moving in a direction toward the engine nozzle, or a component being relatively closer to the engine nozzle as compared to another component.

As used herein, the terms "radial" or "radially" refer to a dimension extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially," refers to moving in a direction toward the outer engine circumference, or a component being relatively closer to the outer engine circumference as compared to another component.

As used herein, the terms "lateral" or "laterally" refer to a dimension that is perpendicular to both the axial and radial dimensions. The terms "forward", "aft", "upper", "lower", "below" and the like are with reference to the normal operational attitude of the engine and should not be considered otherwise limiting.

The term stage generally includes both a stationary vane and a rotating blade. However, the counter-rotating blades may not include a stationary vane separating the blades as is customary in the art.

Figure 1:
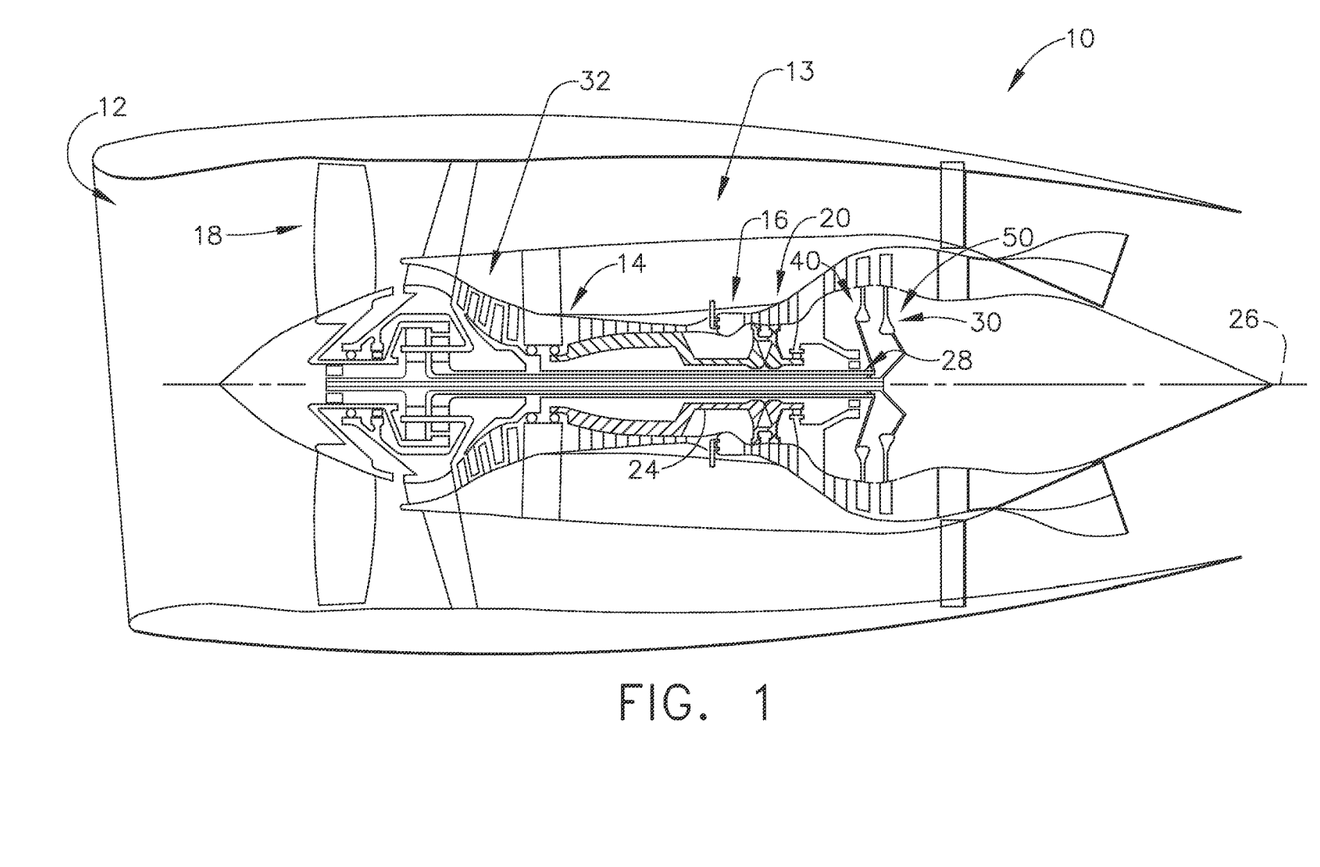
FIG. 1 is a side section view of a gas turbine engine.

Referring initially to FIG. 1, a schematic side section view of a gas turbine engine 10 is shown having an engine inlet end 12 wherein air enters the propulsor or core 13 which is defined generally by a compressor 14, a combustor 16 and a multi-stage high pressure turbine 20. Collectively, the propulsor 13 provides thrust or power during operation. The gas turbine 10 may be used for aviation, power generation, industrial, marine or the like.

Figure 2:
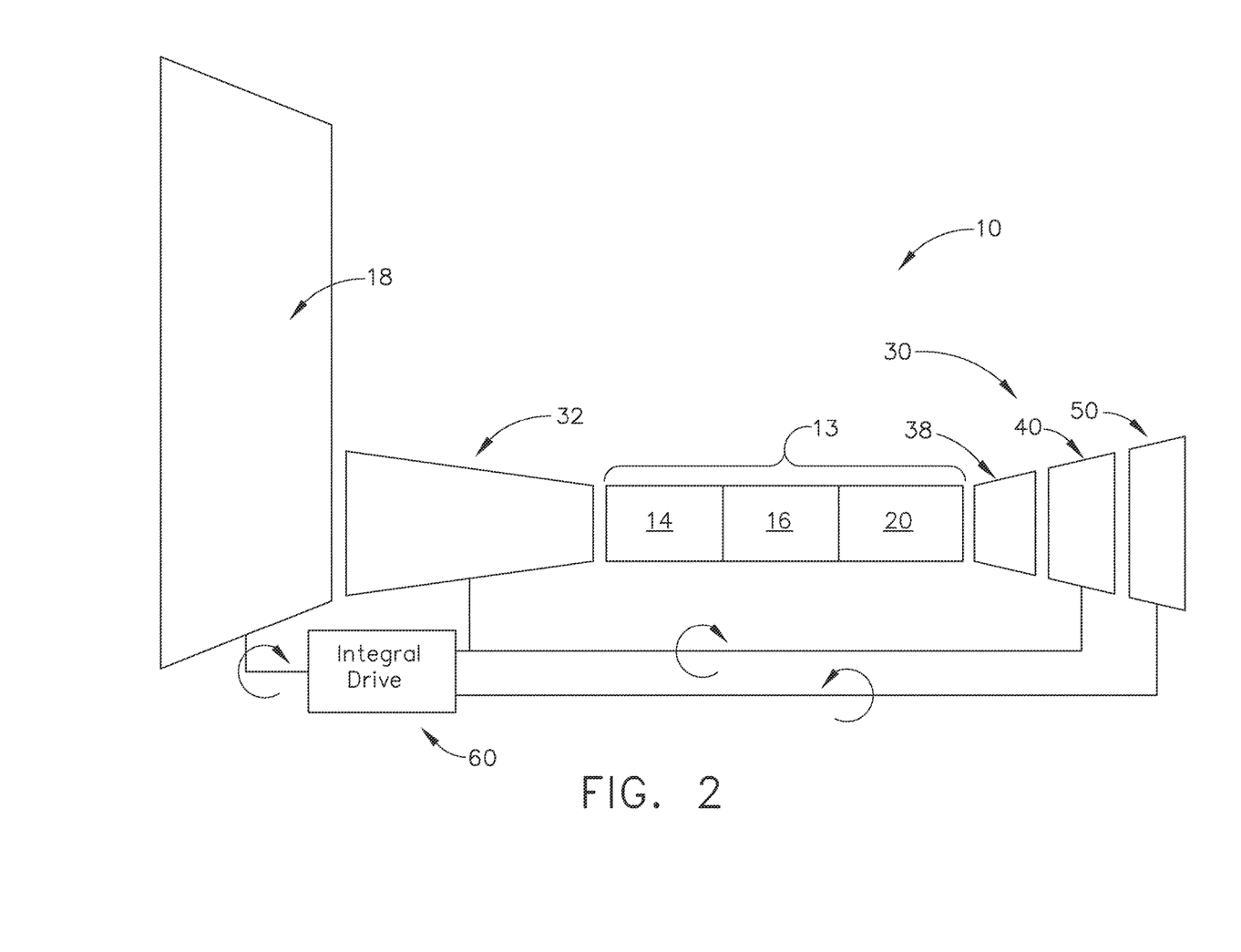
FIG. 2 is schematic view of a gas turbine engine with integral drive and counter-rotating stages in the turbine.

In operation air enters through the air inlet end 12 of the engine 10 and moves through at least one stage of compression where the air pressure is increased and directed to the combustor 16. The compressed air is mixed with fuel and burned providing the hot combustion gas which exits the combustor 16 toward the high pressure turbine 20. At the high pressure turbine 20, energy is extracted from the hot combustion gas causing rotation of turbine blades which in turn cause rotation of the shaft 24. The shaft 24 passes toward the front of the engine to continue rotation of the one or more compressor stages 14, a turbofan 18 or inlet fan blades, depending on the turbine design. The turbofan 18 is operably connected to a low pressure turbine 30 and creates thrust for the turbine engine 10. The low pressure turbine 30 may also be utilized to extract further energy and power additional low pressure compressor stages or booster 32 (FIG. 2). The low pressure air of the fan 18 and/or booster 32 may be used to aid in cooling components of the engine as well.

The gas turbine 10 is axis-symmetrical about engine axis 26 or shaft 24 so that various engine components rotate thereabout. The axis-symmetrical shaft 24 extends through the turbine engine forward end into an aft end and is journaled by bearings along the length of the shaft structure. The shaft rotates about the centerline 26 of the engine 10. The shaft 24 may be hollow to allow rotation of one or more low pressure turbine shafts 28 therein and independent of the shaft 24 rotation. Shafts 28 also may rotate about the centerline axis 26 of the engine and may rotate in one direction or in differing directions. During operation the shafts 28 rotates along with other structures connected to the shaft such as the rotor assemblies of the turbine in order to create power or thrust for various types of turbines used in power and industrial or aviation areas of use.

A low pressure turbine 30 is toward the aft end of the gas turbine engine 10. The depicted turbine has at least two stages, a first stage 40 and a second stage 50. The low pressure turbine 30 and corresponding stages 40, 50 are operably connected to a low pressure compressor or booster 32 aft of the inlet fan 18.

Referring now to FIG. 2, a schematic view of the exemplary gas turbine engine 10 is depicted. The engine core 13 includes a high pressure compressor 14, the combustor 16 and high pressure turbine 20. Aft of the high pressure turbine 20 is a low pressure turbine 30. The low pressure turbine 30 includes a turbine vane 38 at a forward end of the assembly and first and second stage blades 40, 50. The turbine vane 38 turns and accelerates combustion gas to maximize extraction of energy at the rotating blades of the first stage 40. The first stage 40 rotates in a first direction while the second stage 50 rotates in a second opposite direction such that the first and second stages 40, 50 are counter-rotating in nature. The only vane 38 in the low pressure turbine 30 is forward of the first stage 40. Thus, as opposed to various prior art designs, the low pressure turbine 30 is vaneless between the first and second stages 40, 50 in that there is no stationary turbine vane 38 located between the first stage 40 and the second stage 50. As a result, there are fewer engine parts, and a shorter engine length which reduces weight of the engine and improves efficiency and performance the engine 10. Additionally, this arrangement facilitates the design of efficient high bypass ratio (BPR), low fan pressure ratio (FPR) aircraft engine architectures with optimized design speeds for the fan, booster and low pressure turbine. Booster stage count in the turbine 30 is reduced with the increase in shaft speed provided in the integral drive. The low pressure turbine stage count is reduced with the increase in shaft speed while the counter-rotation allows for elimination of the fixed vanes between the rotating blades of the each stage. It should be understood however, that reduction of stages to reduce weight may only be a desirable goal of aircraft engine usage, so it should be considered within the scope of this disclosure that alternate embodiments may utilize more than two low pressure turbine stage, for example in power generation. Finally, the architecture provides lower torque load on carrier/fan frames and reduced load on engine shaft bearings.

Various turbine arrangements may be utilized. For example, a high pressure stage and a low pressure stage may be counter-rotating. Alternatively, two high pressure stages may be counter-rotating. As a further alternative, two low pressure stages may be counter-rotating as shown in the exemplary embodiments.

At a forward end of the core 13 is a high speed booster or low pressure compressor 32. The booster or low pressure compressor 32 is located forward of the high pressure compressor 14. A portion of the power of the first stage blades 40 powers the booster 32. The other portion of the first stage 40 power and second stage 50 power are input to an integral drive 60 to power the fan 18. As mentioned previously, it is desirable that the low pressure turbine 30, the booster 32 and the fan 18 be able to operate at their desired or most efficient operating conditions which may be at different rotational speeds. Accordingly, instant embodiments optimize performance by allowing the operational speed of these components to vary. In this arrangement, the booster or low pressure compressor 32 may operate at a different speed than the second stage of the low pressure turbine 30, for example the second stage 50, which allows improved efficiency between these components. Additionally, since the fan 18 is not directly coupled to the low pressure turbine 30, the fan can operate at a speed to improve fan efficiency as well. It should be noted that while the integral drive 60 is shown offset from the core 13 and booster 32 in the schematic view, the integral drive 60 may be in-line with the shafts and axis or centerline 26 (FIG. 1) of the engine 10.

Figure 3:
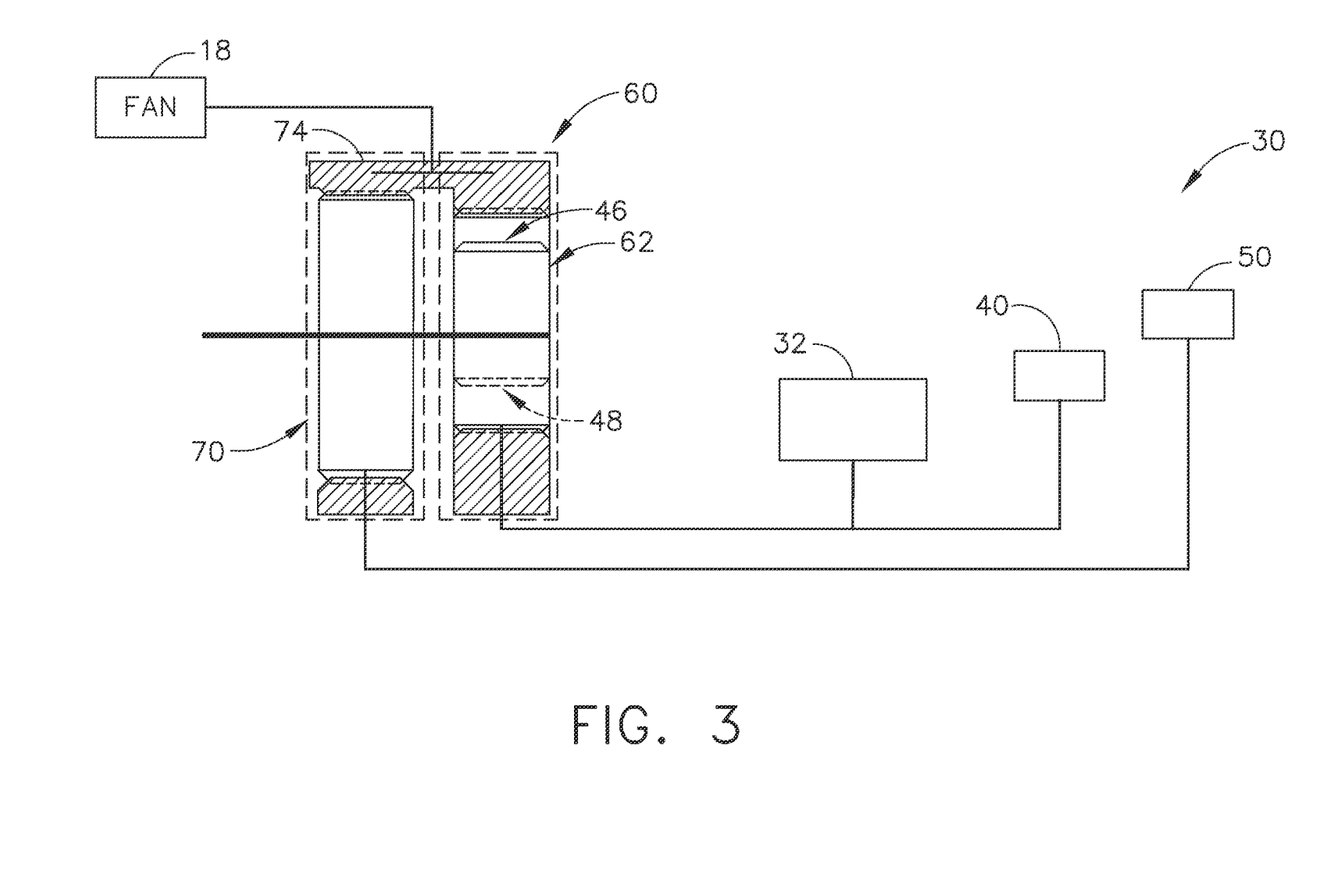
FIG. 3 is an alternate schematic view of the gas turbine engine.

Referring now to FIG. 3, a schematic view of the relationship between the integral drive 60 and the low pressure turbine 30 is depicted. According to the instant embodiment, the first stage 40 rotates converting the combustion gas to mechanical power. The mechanical power of the first stage 40 is divided between the booster 32 and the integral drive 60. This may be an even division or may be a higher amount to the booster 32/lesser amount to the fan 18, or vice-versa. The second stage 50 also powers the integral drive 60. Therefore, the integral drive 60 receives two inputs, a partial input from the first stage 40 and a full input from the second stage 50. The integral drive 60 provides a single output of power to the fan 18 as previously described.

The integral drive 60 may be a gear train such as a planetary gear system, star gear system or other gear system. It should be understood that various gear systems and arrangements may be utilized to provide shorter, lighter systems that operate to optimize aerodynamic speeds and increase fuel efficiency. According to the instant embodiment, the drive 60 includes two drives stages: an idler star stage 62 which is shown aft of a star stage 70. According to the instant embodiment, the idler star stage 62 receives input power from the first stage 40 and the star stage 70 receives input power from the second stage 50. This transfer of power is performed by rotary shafts which rotate an assembly of gears. The two input shafts are high speed, low torque shafts. The turbine 30 and booster or low pressure compressor 32 generally operate at a higher speed than the fan 18. As mentioned before, the stages 40, 50 are counter-rotating so that the input shafts to each of the stages 62, 70 are also oppositely rotating. The idler star stage 62 and the star stage 70 include a common ring gear 74 engaging both the drive stages 62, 70 and which drives the fan 18. Coupling the shafts of the turbine 30 and the fan 18 through the drive 60 facilitates speed control and minimizes problems associated with differing speed and counter-rotating structures.

Figure 4:
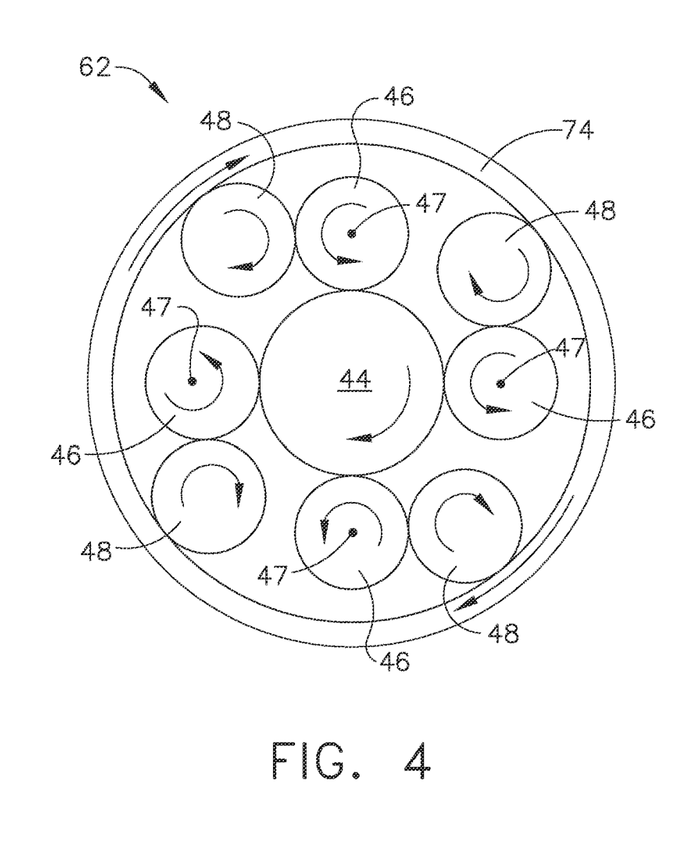
FIG. 4 is an idler star stage of the integral drive of FIG. 3.

Referring now to FIG. 4, the idler star stage 62 is depicted in an aft-looking-forward view. The idler star stage 62 is shown having an input 44 which is provided from the first stage 40 of the low pressure turbine 30. The input 44 may be embodied by a gear or a sun gear 44 which is positioned over the at least one shaft 28 extending from the low pressure turbine 30. In the instant exemplary embodiment, the shaft 28 is operably connected to the first stage 40 of the low pressure turbine 30. The input or sun gear 44 rotates in a clockwise direction according to the instant embodiment. Such rotation drives the rotation of the alternate gears described further herein. The rotation speed of the input gear 44 is equivalent to the low pressure turbine first stage 40, as they are physically connected by shaft 28. Rotation of the input or sun gear 44 causes rotation of the idler gear 46 in a counter-clockwise direction according to the instant embodiment. The idler gear 46 is fixed in position relative to the sun gear 44 and does not orbit such gear 44. Instead, the idler gear 46 only rotates about a fixed axis 47.

A planet or planetary gear 48 is in operable communication with the idler gear 46 and also with the common ring 74. The planet gear 48 is also fixed in position and rotating about a stationary axis and therefore, the fixed nature of the idler gear 46 and planet gear 48 causes the common ring 74 to rotate about the assembly of idler gears 46, planet gears 48 and sun gear 44. The rotation of these various gears causes a clockwise rotation of the common ring 74, according to the exemplary embodiment. Various numbers of idler gears and planet gears 46, 48 as well as sizes of idler and planet gears, may be utilized within the instant embodiment in order to provide the desired rotational speed and size for the common ring 74 utilized.

Figure 5:
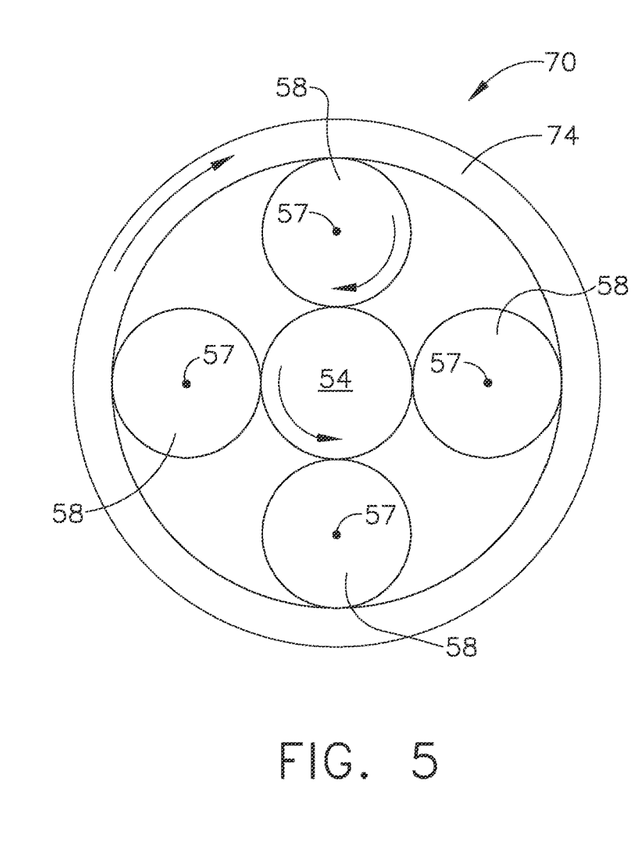
FIG. 5 is a star stage of the integral drive of FIG. 3.

Referring now to FIG. 5, an aft looking forward view of the star stage 70 is provided. In the center of the star stage 70 is an input or sun gear 54 which in the instant embodiment has a counter-clockwise rotation. The sun gear or input 54 is axi-symmetrical with the center line 26 (FIG. 1) of the engine and is mounted on a shaft extending from the low pressure turbine second stage 50. The input gear 54 is surrounded by planet gears 58. Various numbers of planet gears 58 as well as sizes of planet gears, may be utilized within the instant embodiment in order to provide the desired rotation speed and size for the common ring 74 utilized. With the input 54 rotating in a counter-clockwise direction, each of the planet gears 58 rotates in a clockwise direction. The planet gears 58, like the idler gears 46, are stationary and do not orbit but only rotate about a fixed axis 57. The rotation of the planet gears 58 causes rotation of the common ring 74 in the counter clockwise direction. Although the input 44, 54 rotate in opposite directions, the common ring 74 is rotating in the same direction at both stages 62, 70. The common ring 74 in FIG. 5 is the same structural element of the common ring 74 in FIG. 4. In other words, according to the instant embodiment, the common ring 74 is a one-piece structure extending over both gear assemblies of FIG. 4 and FIG. 5.

One skilled in the art will realize that the structure of the star stage 70 and the idler star stage 62 allows for input in two opposed directions with a single output in a single direction to drive a fan. Further, the low pressure turbine first stage 40 may operate at a first speed, the second stage 50 of the low pressure turbine 30 may operate at a second speed and the booster 32 may operate at the first speed while the fan 18 operates at a third speed. In this way, the efficiencies of each of these components of the gas turbine engine 10 may be optimized for improved performance without affecting the operation of an alternate component. Moreover, the power from one of the low pressure turbine stages may be split to power both a booster and fan while the other of the first and second stages 40, 50 may be used in full to power the fan 18.

The integral drive 60 is housed within a single carrier or housing and provides two sets of planetary gears and a common ring gear 74. Pins are utilized for the planet gears 58 in star stage 70, and the idler or planet gears 46, 48 in the idler star stage 62. Additionally, the integral drive 60 allows for counter-rotating low pressure turbine stages.

Figure 6:
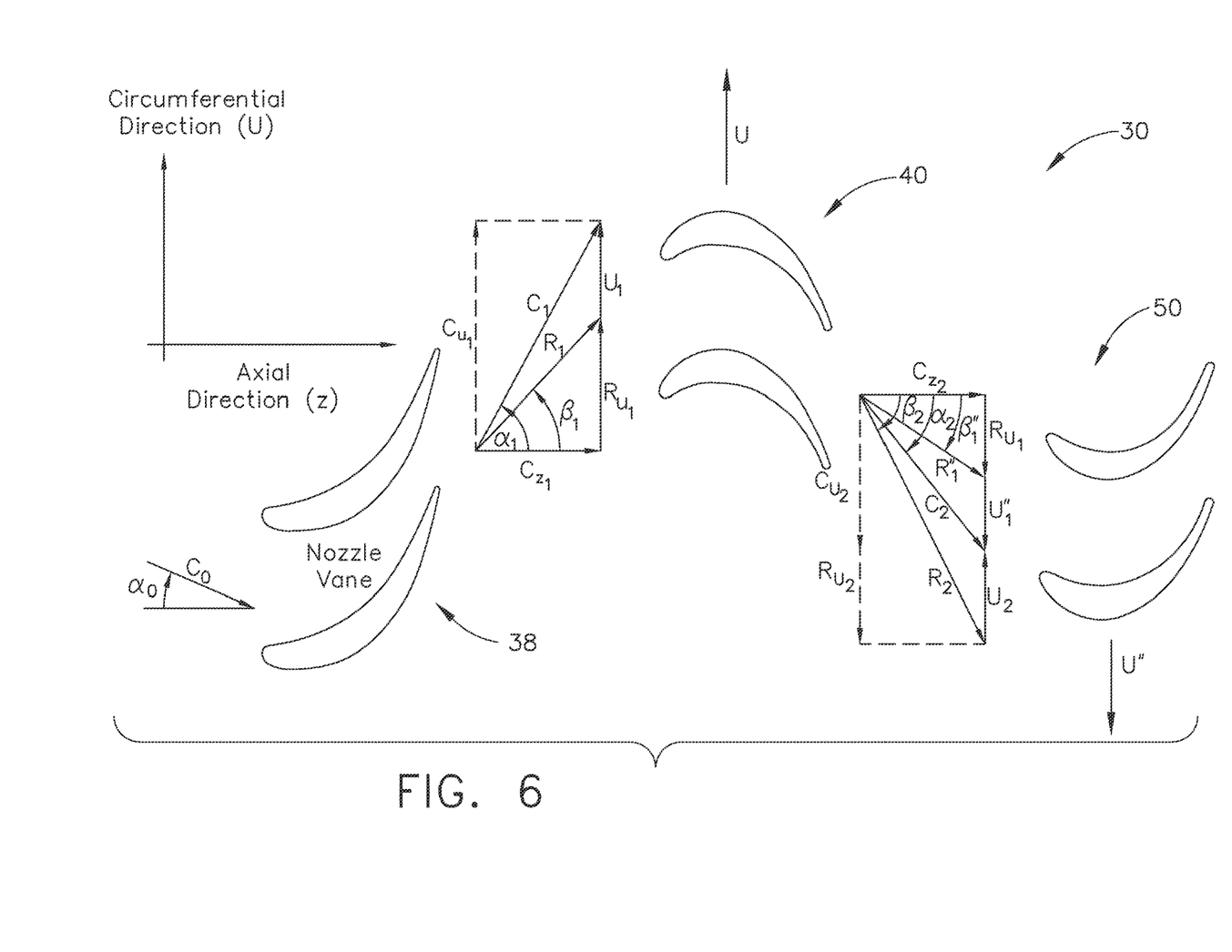
FIG. 6 schematic view of the vaneless stages of the turbine.

Referring now to FIG. 6, a schematic representation of an exemplary low pressure turbine 30 is depicted in two-dimensional space. A plurality of nozzle vanes 38 are shown in an axial-forward position and combustion gas moves through these vanes toward a first stage 40 including the exemplary rotor blades depicted in a second stage 50. The Figure provides various nomenclatures related to the air flow vectors shown therein. The symbol $\alpha$ represents an angle of air flow relative to the axial center line 26 (FIG. 1) of the engine 10. The vector $C_0$ depicts an air flow velocity at the inlet to the nozzle vanes 38. The nozzle vanes 38 are curved to turn and accelerate the air flow prior to the air reaching the first stage 40 and the rotating blades therein. As the air flow exits the nozzles or vanes 38, an absolute velocity vector $C_1$ is depicted. This vector is comprised of two components, $C_{u1}$ which represents the component of the air flow in the circumferential direction, and $C_{z1}$ which represents a component in the axial direction at a location between the nozzle vanes 38 and the inlet to the first stage 40. The angle $\alpha_1$ is the angle of the absolute velocity $C_1$ relative to the axial center line. The tangential component of the absolute velocity vector $C_1$ provides the necessary force on the rotor blades of the first stage 40 to cause rotation of the blades in a first circumferential direction. As the air flow $C_1$ exits the first stage 40, a second vector $C_2$ is provided to depict the turning of air from the first stage 40 toward the second stage 50. The second vector $C_2$ is also comprised of first and second components. The first component is $C_{z2}$ representing the axial direction and the second component is $C_{u2}$, which represents $R_{u1}+U''_1$, and which represents the tangential component of the flow vector $C_2$. This tangential component $C_{u2}$ provides the force to cause rotation of the rotor blades of the second stage 50. In this configuration, the blades of the first stage 40 and the blades of the second stage 50 are directly adjacent to one another meaning no vane is positioned between the first stage and the second stage 40, 50. This allows for shortening of the turbine and overall engine length as well as a reduction of parts described previously.

Figure 7:
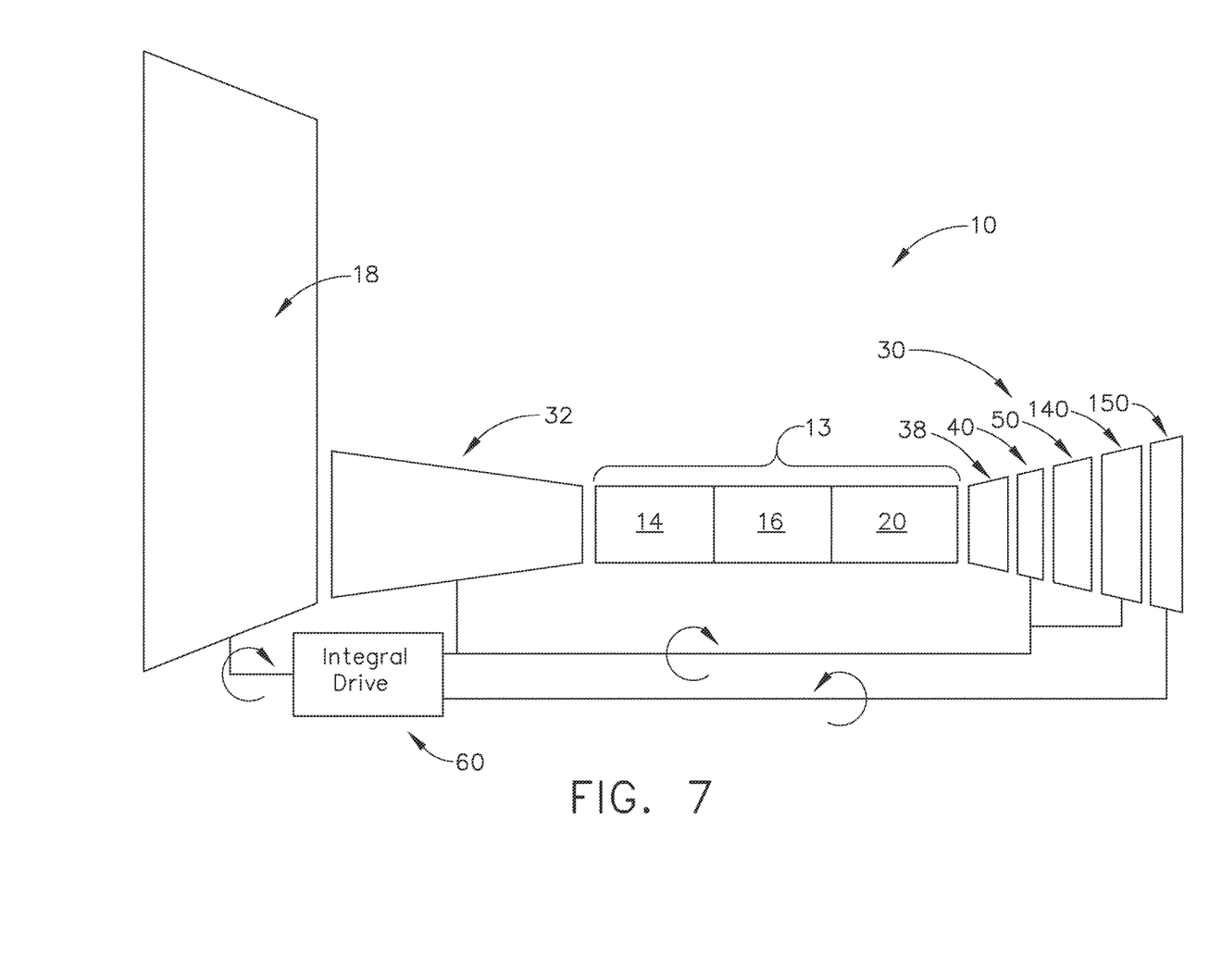
FIG. 7 is a schematic view of an alternate embodiment of a gas turbine engine.

Referring now to FIG. 7, an alternate schematic view is shown wherein the low pressure turbine 130 has a first vane 138, a first blade 139, a second vane 141, a second blade 140 and a third counter-rotating blade 150. The embodiment may be differentiated from previous embodiments in that the low pressure turbine may include stages downstream of the first vane and rotating stage which are counter-rotating. Alternatively stated, the counter-rotating blades of the low pressure turbine need not be immediately adjacent the first vane of the low pressure turbine but instead may be one or more stages aft of the first stage vane and blades.

The foregoing description of structures and methods has been presented for purposes of illustration. It is not intended to be exhaustive or to limit the structures and methods to the precise forms and/or steps disclosed, and obviously many modifications and variations are possible in light of the above teaching. Features described herein may be combined in any combination. Steps of a method described herein may be performed in any sequence that is physically possible. It is understood that while certain forms of composite structures have been illustrated and described, it is not limited thereto and instead will only be limited by the claims, appended hereto.

While multiple inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Examples are used to disclose the embodiments, including the best mode, and also to enable any person skilled in the art to practice the apparatus and/or method, including making and using any devices or systems and performing any incorporated methods. These examples are not intended to be exhaustive or to limit the disclosure to the precise steps and/or forms disclosed, and many modifications and variations are possible in light of the above teaching. Features described herein may be combined in any combination. Steps of a method described herein may be performed in any sequence that is physically possible.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding,"

"composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A gas turbine engine, comprising:
   a fan;
   a compressor;
   a turbine having first stage blades and second stage blades, said first stage blades rotating in a first direction and said second stage blades rotating in a second direction opposite said first direction, said first stage blades and said second stage blades being directly adjacent to one another;
   a drive in operable input connection with said fan and in operable output connection with said first stage blades and said second stage blades, said first stage blades and said second stage blades driving said fan through said drive, wherein the drive comprises an idler star stage coupled to the first stage blades of the turbine to receive input power therefrom, and further wherein the drive comprises a star stage forward of the idler star stage, wherein the star stage is coupled to the second stage blades of the turbine to receive input power therefrom, and wherein the drive further comprises a ring gear engaged to the idler star stage and the star stage, wherein the idle star stage comprises a first input gear rotatable in a first direction, wherein the first input gear is coupled to the ring gear via a first planet gear, and wherein the star stage comprises a second input gear rotatable in a second direction surrounded by a second planet gear fixed in position and rotatable in the first direction, and wherein the second input gear is coupled to the ring gear via the second planet gear; and
   said compressor also being driven by said first stage blades.

2. The gas turbine engine of claim 1, said turbine being a low pressure turbine.

3. The gas turbine engine of claim 1, said idler star stage having at least one pair of gears between an input and an output of said drive.

4. The gas turbine engine of claim 1, said star stage having multiple gears in communication with an input and with an output.

5. The gas turbine engine of claim 1 further comprising a vane forward of said first stage blades.

6. The gas turbine engine of claim 5, said vane immediately preceding said first stage blades.

7. The gas turbine engine of claim 5, said counter-rotating first and second stage blades being spaced by one or more stages from a forward end of said turbine.

8. The gas turbine engine of claim 1, wherein the first stage blades and the compressor operate at a first speed, the second stage blades operate at a second speed, and the fan operates at a third speed.

9. The gas turbine engine of claim 1, wherein the compressor is coupled to the first stage blades at a location between the first stage blades and the drive.

10. The gas turbine engine of claim 1, wherein the second input gear is directly coupled to the ring gear via the second planet gear.

11. The gas turbine engine of claim 1, wherein the idler star stage comprises an idler gear fixed in position relative to the first input gear and rotatable about a fixed axis.

12. The gas turbine engine of claim 11, wherein the first planet gear is fixed in position and rotatable about a stationary axis in operable communication with the idler gear, and wherein the first input gear is directly coupled to the ring gear via the idler gear and the first planet gear.

13. A gas turbine engine, comprising:
   a fan;
   a compressor in fluid communication with a combustor;
   a turbine in fluid communication with combustion gas from said combustor; said turbine having at least two counter-rotating stage blades, said two counter-rotating stage blades being free of intermediate vanes;
   a drive operably connected intermediate to said turbine and said fan such that the drive is in operable input connection with the fan, said drive having a split power path receiving power input from at least two sources, wherein the drive comprises an idler star stage coupled to the first stage blades of the turbine to receive input power therefrom, and further wherein the drive comprises a star stage forward of the idler star stage, wherein the star stage is coupled to the second stage blades of the turbine to receive input power therefrom, and wherein the drive further comprises a ring gear engaged to the idler star stage and the star stage, wherein the idle star stage comprises a first input gear rotatable in a first direction, wherein the first input gear is coupled to the ring gear via a first planet gear, and wherein the star stage comprises a second input gear rotatable in a second direction surrounded by a second planet gear fixed in position and rotatable in the first direction, and wherein the second input gear is coupled to the ring gear via the second planet gear;
   a fan shaft and shafts of said two counter-rotating stage blades being independent of one another;
   wherein one of said two counter-rotating stage blades powers said compressors and said fan, and the other of said two counter-rotating stage blades powers said fan.

14. The gas turbine engine of claim 13, said drive receiving power from each of said two stages of said turbine.

15. The gas turbine engine of claim 13, said turbine being a low pressure turbine.

16. The gas turbine engine of claim 13, said turbine having a stationary vane, a first stage blade downstream of said stationary vane and a second stage blade downstream of said first stage blade.

17. The gas turbine engine of claim 16, wherein the compressor is coupled to the first stage blade at a location between the first stage blade and the drive.

18. The gas turbine engine of claim 13, said counter-rotating stage blades being spaced from a forward end of said turbine by one or more stages.

19. The gas turbine engine of claim 13, wherein the idler star stage comprises an idler gear fixed in position relative to the first input gear and rotatable about a fixed axis.

20. The gas turbine engine of claim 19, wherein the first planet gear is fixed in position and rotatable about a stationary axis in operable communication with the idler gear, and wherein the first input gear is directly coupled to the ring gear via the idler gear and the first planet gear.

* * * * *